US006964050B1

(12) United States Patent
Do

(10) Patent No.: US 6,964,050 B1
(45) Date of Patent: Nov. 8, 2005

(54) ARRANGEMENT FOR SIMPLIFYING THE DESIGN AND IMPLEMENTATION OF MOBILE SERVICES IN A COMMUNICATION SYSTEM

(75) Inventor: Thanh Van Do, Oslo (NO)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/412,334

(22) Filed: Oct. 5, 1999

Related U.S. Application Data

(63) Continuation of application No. PCT/NO98/00104, filed on Apr. 2, 1998.

(30) Foreign Application Priority Data

Apr. 8, 1997 (NO) ...................................... 971605

(51) Int. Cl.[7] ................................................ G06F 9/46
(52) U.S. Cl. ...................... 719/316; 455/3.01; 709/201
(58) Field of Search ............................... 455/403–420, 455/436–460, 3.01–3.06; 709/313–317, 201–207, 709/217–229, 249; 370/200–545; 719/316

(56) References Cited

U.S. PATENT DOCUMENTS 5,517,677 A * 5/1996 Moon ....................... 455/161.1
6,330,586 B1 * 12/2001 Yates et al. .................. 709/201

OTHER PUBLICATIONS

Chapman et al. "An overview of the Telecommunications Information Networking Architecture" Jun. 1996 Electronics & Communication Engineering Journal pp. 135-141.*
Eckert et al. "Tangram: Development if Object-Oriented Frameworks for TINA-C-Based Multimedia Telecommunication Applications" IEEE pp. 43-49.*
Puder et al. "System Support for Knowledge-Based Trading in Open Service Markets" University of Frankfurt pp. 289-296.*
Tokmakoff et al. "Service Brokering in Object-Based Systems: Advanced Information Services" IEEE pp. 43-48.*
TINA-C Deliverable "Engineering Modelling Concepts (DPE Architecture)" version 2.0 pp. 3-1-6-1.*
Leydekkers P "A Computational and Engineering View on Open Distributed Real-Time Multimedia Exchange" pp. 1-12..*
*TINA*-A common software architecture for multimedia and information services, www.TINA.com, Mar. 12, 1996.
*IEEE Computer Society Technical Committee on Distributed Processing*, Infromation Processing Soviety of Japan, Nov. 1995, Tokyo, Japan, Ming T. (Mike) Liu, pp. 296-304, "International Conference on Network Protocols".

(Continued)

*Primary Examiner*—Meng-Al T. An
*Assistant Examiner*—Charles Anya
(74) *Attorney, Agent, or Firm*—Nixon & Vanderhye P.C.

(57) ABSTRACT

The present invention relates to an arrangement for simplifying the design and implementation of mobile services in a communication system, especially a telecommunications system, said system comprising distributed hardware and software components which interact in order to provide services to one or more users, and for the purpose of this improved availability it is according to the present invention suggested a solution of introducing in said system a mobility transparency, for thereby enabling facilitated application design including inter alia terminal or personal mobility. Special emphasis is made on solutions based on realising mobility transparency by in-line solution, broker solution and proxy solution.

23 Claims, 7 Drawing Sheets

The In-line alternative

OTHER PUBLICATIONS

*Proceedings of the Thirtieth Annual Hawaii International Conference*, vol. 1, Jan. 1997, M. Khayrat Durmosch et al., pp. 92-99, "The Tanagram DPE—A Distributed Processing Environment in a Heterogeneous Corba 2 World".

*IEEE Communications Magazine*, vol. 36, No. 3, Mar. 1998, France, Juan Pavón et al., pp. 72-79, "COBRA for Network and Service Management in the TINA Framework".

Teminal Mobility Support in TINA, Thanh et al., pp. 1-13.

Mobility and TINA Architecture, In Proceedings of the TINA 96 Conference, vol. ISBN 0. TINA-C, Sep. 1996, Thanh et al.

ITU-TS, Reference Model of Open Distributed Processing—Part 1 Overview and guide to use the Reference Model, Rec.X901, (ISO/IEC 10746-1).

ITU-TS, Basic Reference Model of Open Distributed Processing—Part 3: Prescriptive Model, Rec.X903, (ISO/IEC 10746-3).

TINA-C., Overall Concepts and Principles of TINA, Feb. 1995.

Object Management Group, Inc., The Common Object Request Broker: Architecture and Specification. Revision 2.0, Jul. 1995, www.omg.org/docs/formal/97-02-25.pdf.

TINA-C. Computational Modelling Concepts, Version 3.2, Jan. 1995.

* cited by examiner

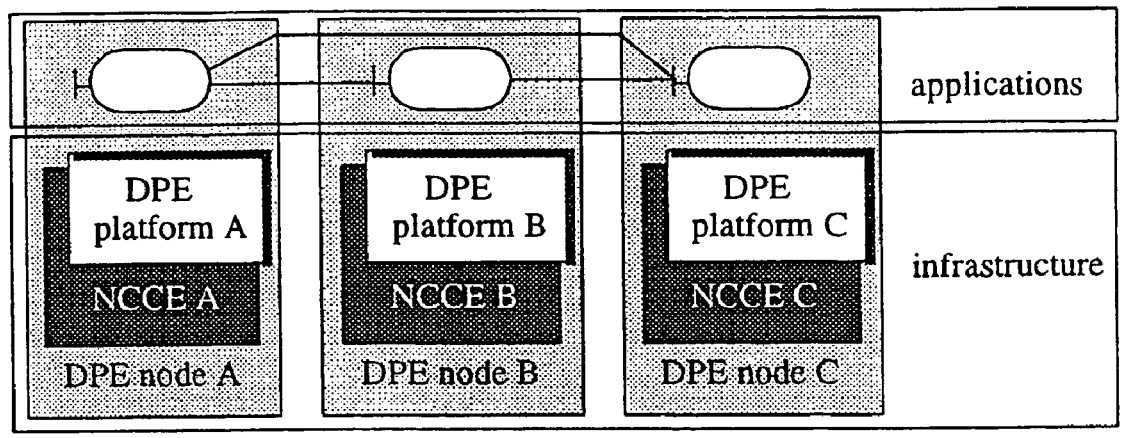
Figure 1    Physical Infrastructure
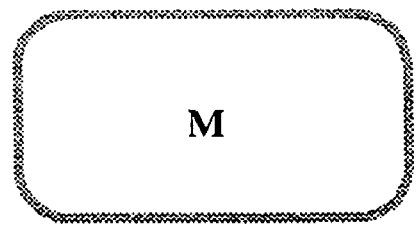
Figure 2    M represent all the mobility functions

Computational Model of the application
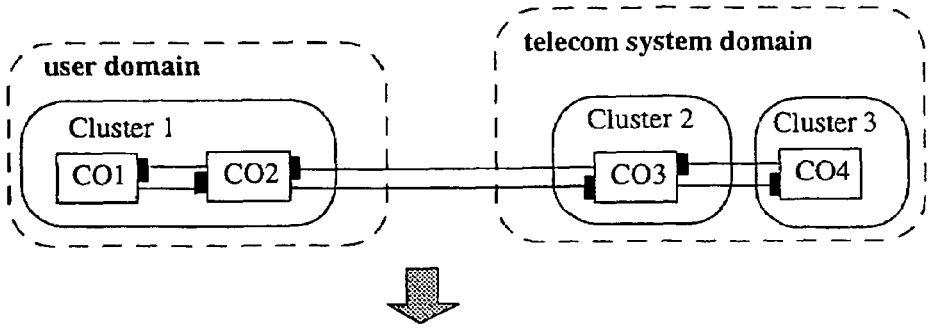
Engineering Model of the application
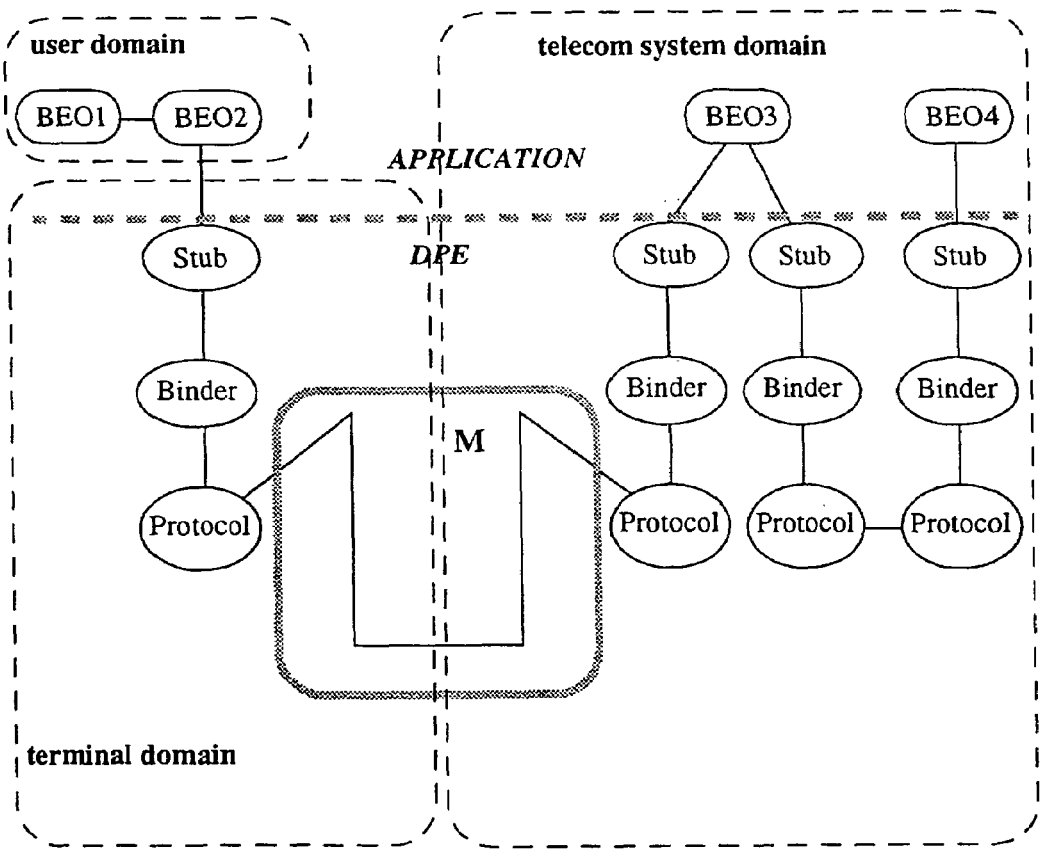
Figure 3  The In-line alternative

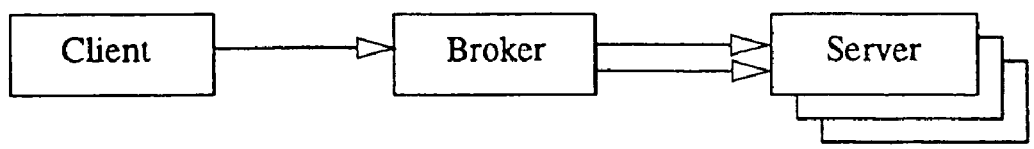
Figure 4    Using broker in client /server interactions
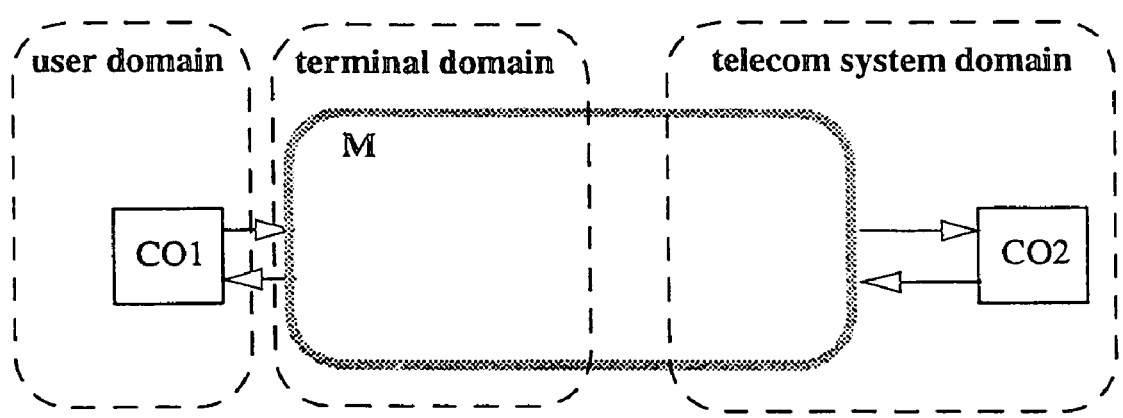
Figure 5    The user agents acting as routing brokers

Computational Model of the application
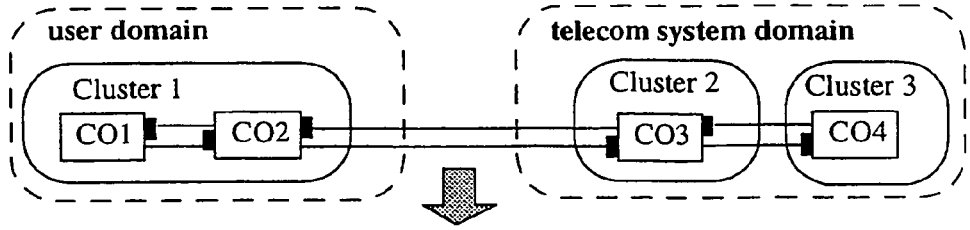
Derived Computational Model of the application
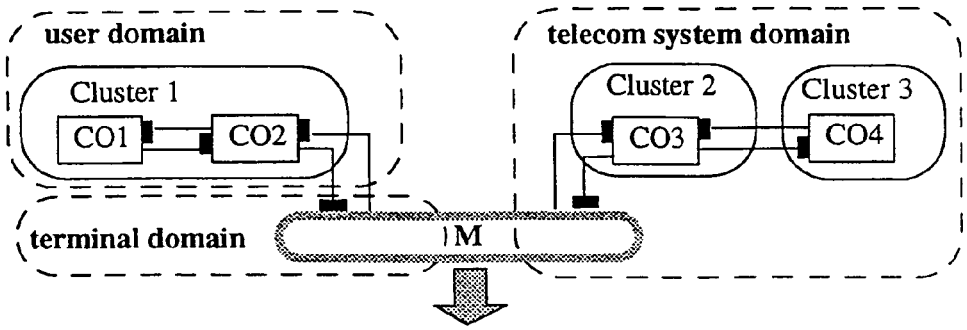
Engineering Model of the application
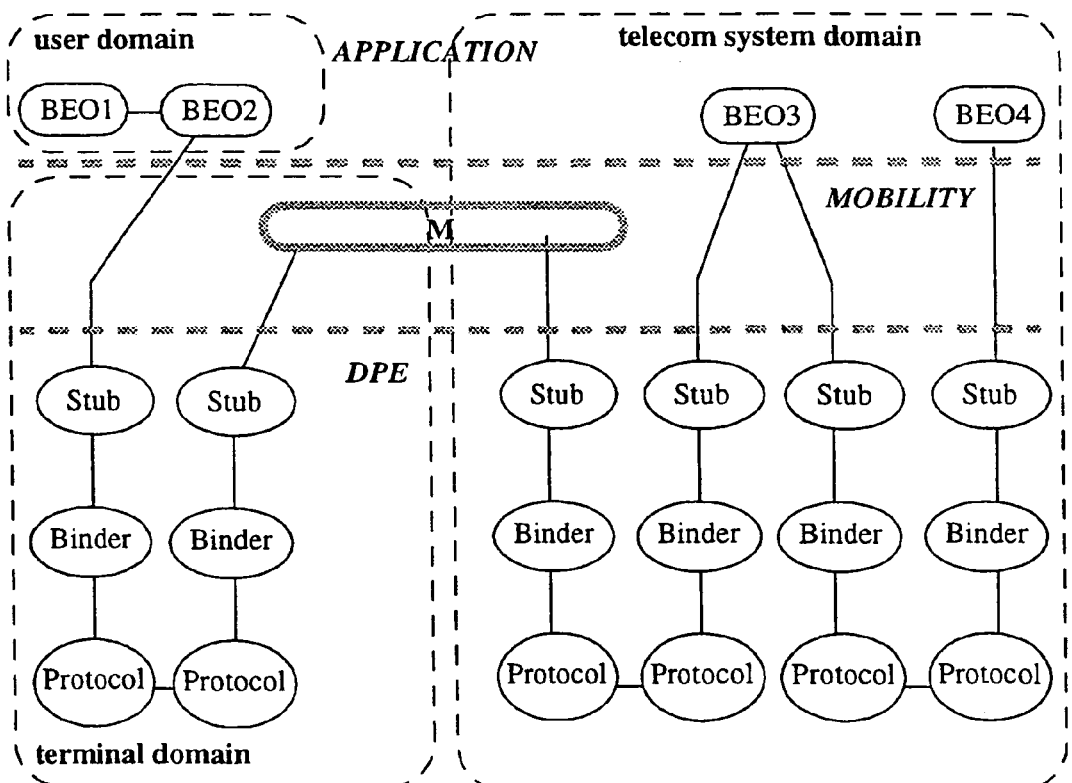
Figure 6    The broker alternative

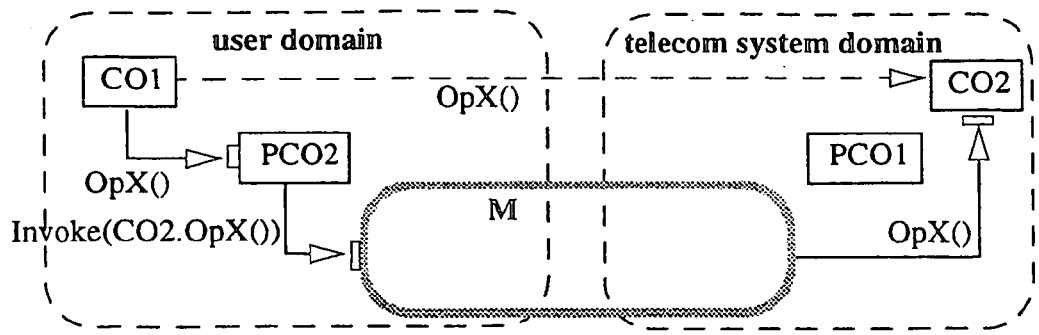
Figure 7    Using proxies to untie the binding between the application and the mobility functions M
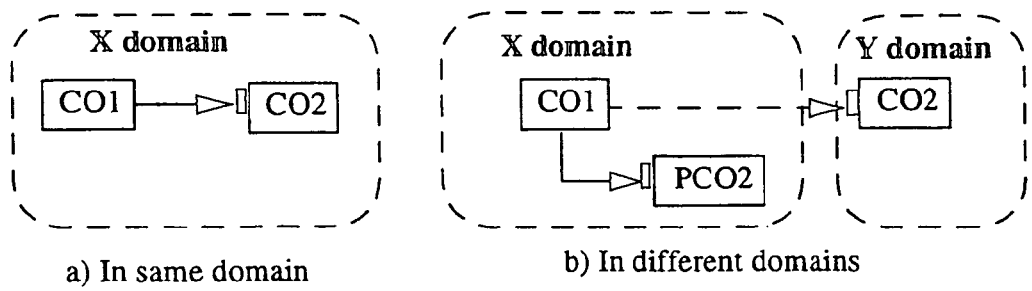
a) In same domain     b) In different domains
Figure 8    Possible configurations at run-time
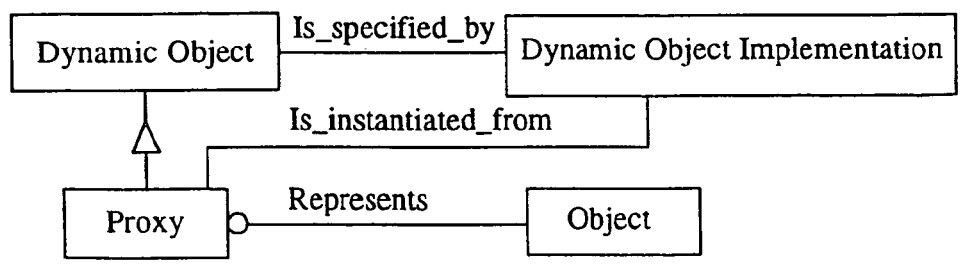
Figure 9    Information model for the Proxy

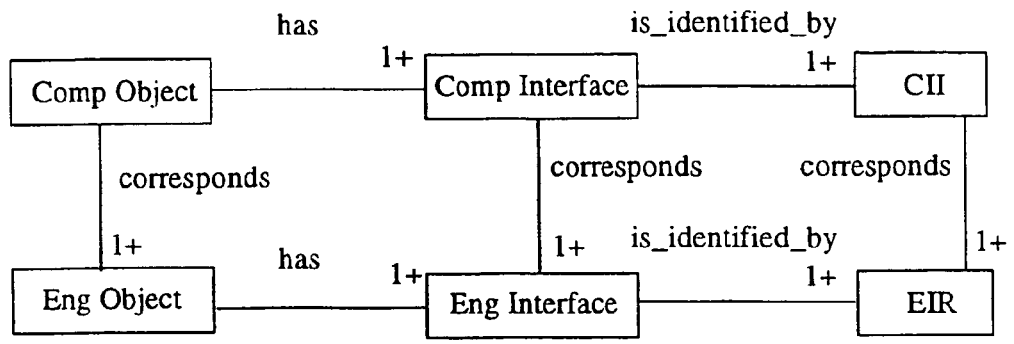
Figure 10  Relationship between objects, interfaces and identifiers in the computational and engineering viewpoints.
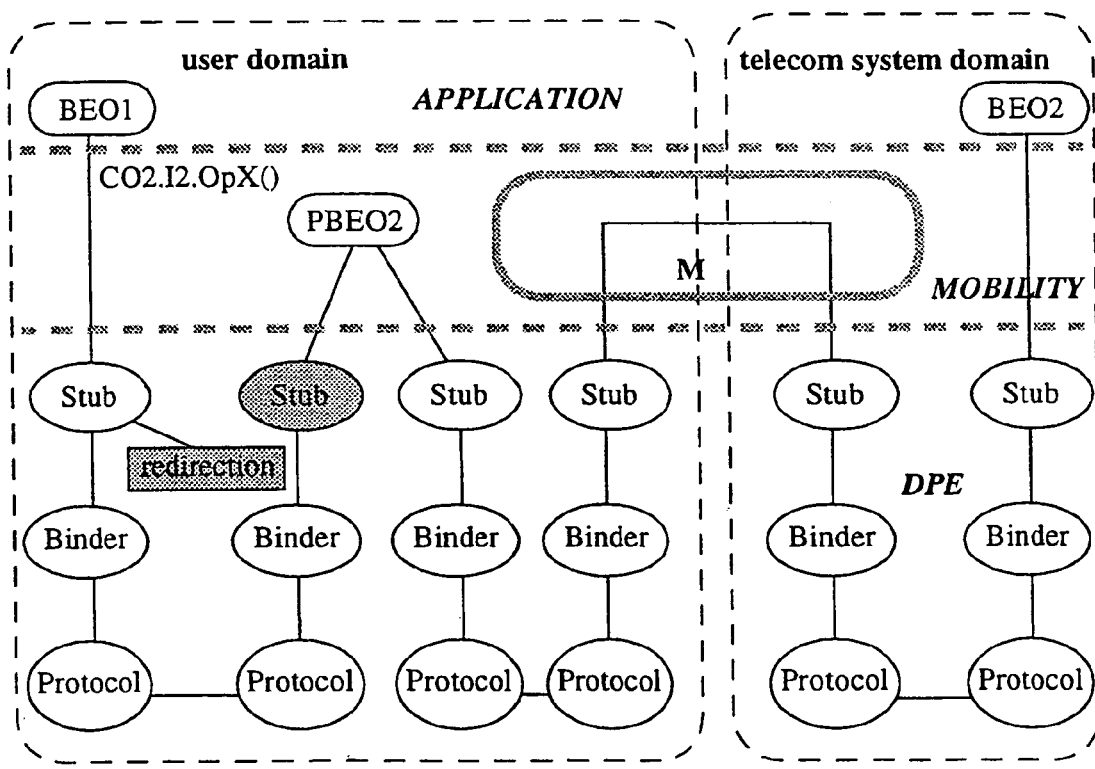
Figure 11  The redirection of operation request to the proxy Computational Model of the application
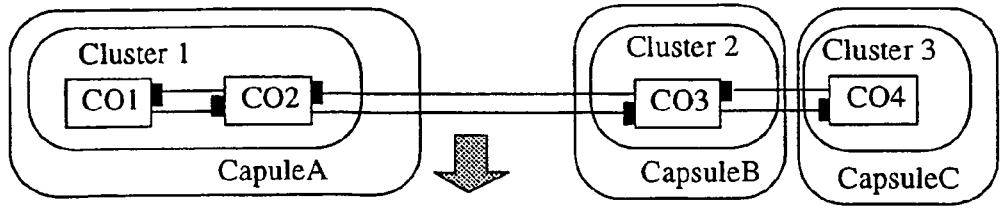
Engineering Model of the application at compile time
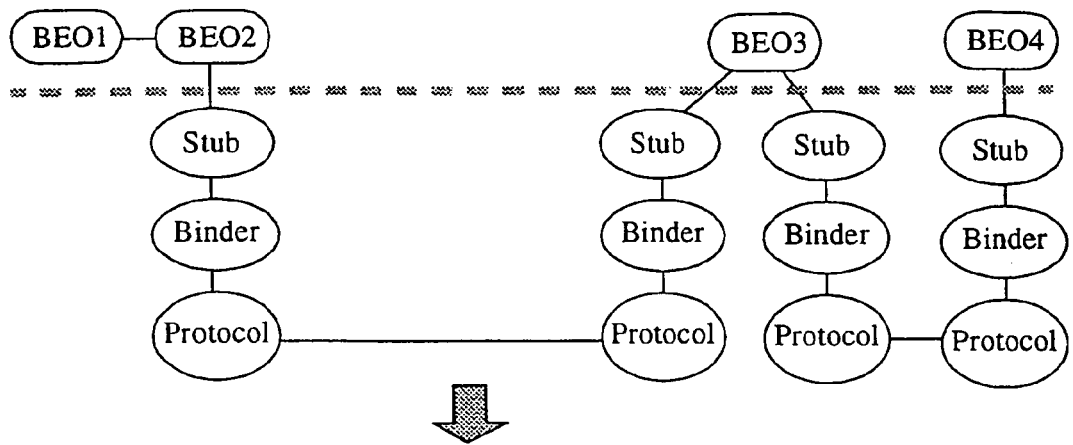
Engineering Model of the application at deployment
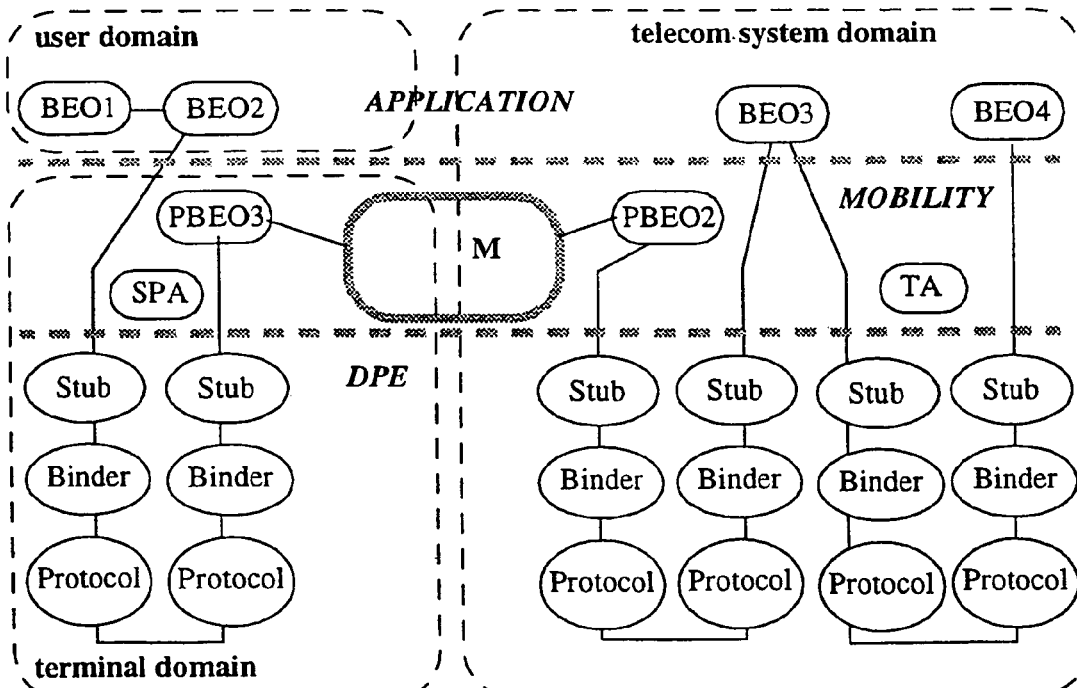
Figure 12    The Proxy alternative

ARRANGEMENT FOR SIMPLIFYING THE DESIGN AND IMPLEMENTATION OF MOBILE SERVICES IN A COMMUNICATION SYSTEM This is a continuation of PCT application No. PCT/NO98/00104, filed 2 Apr. 1998, the entire content of which is hereby incorporated by reference in this application.

FIELD OF THE INVENTION

The present invention relates to an arrangement for simplifying the design and implementation of mobile services in a communication system, especially a telecommunication system, said system comprising distributed hardware and software components which interact in order to provide services to one or more users.

BACKGROUND

The present invention has been developed on the basis that prior art defined distribution transparencies are not sufficient to support mobility.

More specifically the present invention has been developed on the basis of considering mobility as an additional transparency.

In other words, the invention suggests the provision of the mobility support functions in a transparent way, i.e. the application designer needs not to be aware or concerned about the necessary mechanisms and function to support mobility and can concentrate on his application design. Mobility can hence be considered as a new transparency in addition to the ones defined by ODP (Open Distributed Processing) [ITUa] and adopted by TINA (Telecommunication Information Networking Architecture) [TIN95i].

According to ODP/TINA, a telecommunication application is realized by a set of interacting computational objects which rely on an abstract infrastructure called Distributed Processing Environment (DPE). The DPE hides the complex details of mechanisms used to overcome problems caused by distribution.

The process of hiding the effect of distribution is known as distribution transparency in the Open Distributed Processing Reference Model (RM-ODP). The application designers do not need to be aware of the mechanisms necessary to deal with different aspects of distribution and can therefore focus on their application specification. When addressing the distribution of their applications, they only have to express their requirements for transparencies. The properties of distribution is hidden or transparent to the end-users and the application designers in the enterprise, information and computational viewpoints.

The engineering viewpoint defines the mechanisms and functions by which those transparencies are realised. Each set of transparency properties requires the use of a set of standard functions in a specified way.

The distribution transparencies defined by ODP/TINA are:
  Access transparency
  Location transparency
  Federation transparency
  Migration transparency
  Transaction transparency
  Replication transparency
  Failure transparency
  Resource transparency
  Concurrency transparency As shown in FIG. 1, a DPE consists of several DPE nodes A, B and C. A DPE node is a unit of resource administration providing support to the DPE architecture. The part of the DPE node supporting the DPE architecture is called a DPE platform. The computing resource supporting a DPE platform is called Native Computing and Communication Environment (NCCE). Even if the NCCE can itself be locally distributed, there is only one DPE platform associated with a DPE node.

A DPE platform shields the objects from the potential heterogeneity of the NCCE on which they are executed. Not all the transparencies are required to be provided by a DPE platform but only the ones called fundamental. Access transparency and location transparency are the two transparencies which are considered fundamental in the DPE architecture.

Mobility support functions are implemented and offered in different systems such as UPT (Universal Personal Telecommunication) and networks such GSM (Global Mobil System) but never in a transparent way. In order to build new application, the designers must take into account and know fairly well about the mobility support functions. ODP/TINA introduced an efficient framework for designing and implementing distributed applications but assume that mobility is inherently supported. In fact, mobility is not inherently supported. When a terminal which is a DPE node is moving, disappearing and reappearing some moment later at another place, additional mobility functions must be introduced and preferably in a transparent way. In other words, mobility transparency is required.

The design of mobile applications, i.e. applications available to the mobile users, is complex and time-consuming because the designer has to take into account mobility functions which are quite complex and numerous. It is also difficult and time-consuming to make existing fixed applications available to mobile users, i.e. mobile without mobility transparency.

OBJECTS

An object of the present invention is to improve the availability of services in a communication system especially as seen from an application designer's point of view.

Another object of the present invention is to provide the application designer with a tool which is not concerned about the necessary mechanism and function regarding supporting mobility.

Yet another object of the present invention is to provide the designer of applications with a tool whereby the designer has not to take into account mobility functions.

Still another object of the present invention is to provide a tool by which the designer of applications can make fixed applications available to mobile users in a simplified and less time-consuming way.

SUMMARY

The above objects are achieved in an arrangement as stated in the preamble, which according to the present invention is primarily characterized by introducing in said system a mobility transparency, for thereby enabling facilitated application design included inter alia terminal or personal mobility, as well as session mobility both in a continuous way and in a discrete way.

In other words, it is according to the present invention suggested a new transparency, called mobility transparency which is introduced and has for its main object to hide all the necessary mechanisms and functions to support mobility to the application and the application designer. According to the present invention this mobility transparency can also be considered as a new transparency in addition to already existing transparency, for example in addition to the ones defined by ODP (Open Distributed Processing) and adapted by TINA (Telecommunication Information Networking Architecture).

Further features and advantages of the present invention will appear from the following description taken in connection with the enclosed drawings, as well as from the appending patent claims.

BRIEF DISCLOSURE OF THE DRAWINGS

FIG. 1 illustrates schematically a physical infrastructure relating to a distributed processing environment (DPE) consisting of several DPE nodes.

FIG. 2 illustrated schematically the mobility functions which will be implemented according to the present invention.

FIG. 3 is an example of an embodiment according to the present invention, wherein the mobility functions are totally integrated in the infrastructure of platform, representing the in-line alternative.

FIG. 4 is a schematical block diagram illustrating another field of application according to the present invention, wherein the broker in client/server interactions are utilised.

FIG. 5 is a schematical diagram illustrating the embodiment wherein the user agents are acting as routing brokers.

FIG. 6 is a schematical diagram illustrating further details of an embodiment including the broker alternative.

FIG. 7 is a schematical block diagram illustrating still another embodiment of the present invention, wherein proxies are used to untie the binding between the application and the mobility functions.

FIG. 8 illustrated schematically possible configurations at run-time.

FIG. 9 illustrates an information model for the proxy.

FIG. 10 illustrates schematically the relationship between objects, interfaces and identifiers in the computational and engineering viewpoints.

FIG. 11 illustrates further details related to the redirection of operation request to the proxy.

FIG. 12 is a schematical diagram illustrating the computational model of the application in the proxy alternative, especially related to the configuration of the application at installation by which the plant engineer can derive the registration of objects to the mobility functions and the creation of necessary proxies.

DETAILED DESCRIPTION

As stated in the preamble, the main object of the present invention is to introduce a so-called mobility transparency in order to hide all the necessary mechanisms and functions to support mobility to the application and the application designer.

In the following there will be discussed three alternative solutions in which mobility transparency can be provided, namely by the in-line alternative, by the broker alternative, as well as by the proxy alternative.

As previously discussed in connection with FIG. 1 a telecommunication application is realised by a set of interacting computational objects which rely on an abstract infrastructure called Distributed Processing Environment, DPE, said DPE hiding the complex details of mechanisms used to overcome problems caused by distribution. Further, as appearing from FIG. 1 a DPE consists of several DPE nodes A, B and C, a DPE node being a unit of resource administration providing support to the DPE architecture.

Now, turning to FIG. 2 there is illustrated a block designated M, which represents all the functions necessary to support mobility, such as terminal support functions, personal support functions, session support functions, mobility-related support functions, etc.

In the following there will successively be disclosed how M is introduced into the whole system in all three alternatives.

The In-Line Alternative

The most straightforward alternative to make mobility transparent to the application designers at the requirements and functional specification phases, is to integrate the mobility functions M totally into the infrastructure or platform. All the computational objects will not be mapped to basic engineering objects (BEO) but to engineering objects (EO) and will hence not be visible in the computational model of the application. In fact, the mobility function constitutes the engineering object interceptor, standing at the boundary of two domains: the terminal domain and the telecom system domain. This solution is also called in-line because the support of mobility is introduced directly embedded into the platform.

In FIG. 3, we show as example an application consisting of four computational objects CO1, C02, C03 and C04. CO1 and C02 are grouped together into cluster 1 and belong to the user domain. C03 and C04 belong to the telecom system domain but are assigned to clusters 2 and 3.

From the given computational model, an engineering model can be developed. Each Computational Object (CO) is mapped to a Basic Engineering Object (BEO). Of course, a CO can also be mapped to several BEOs but for the sake of simplicity we do not choose this mapping here. Since CO1 and C02 are within the same cluster, interactions between them can be done directly as method calls. Communications between C03 and C04 go through a channel consisting of stubs, binders and protocols since they belong to different clusters. Communications between C02 and C03 go also though a channel because C02 and C03 reside in different clusters, but the channel will now contain an interceptor in addition to the usual objects because it crosses the boundary between two domains (terminal domain and telecom system domain). However, the interceptor is not visible for the application designer and does not have any consequence for the application objects. It is worth noting that the application designer does not need to think about the terminal domain in the computational model (upper part of FIG. 3). In the engineering model (lower part of FIG. 3) there is also drawn a borderline between the application layer and the DPE/platform layer. This borderline is in fact not a real and existing border but just a virtual one. In showing that, we aim to visualise that the mobility functions M is fully integrated in the DPE.

If the mobility functions M is implemented and fully integrated into the platform and there exist development tools able to generate channels containing the mobility functions as interceptor, then the design and implementation of mobile applications are no more complex than the ones of fixed applications. From the computational model, in addition to the usual grouping of objects into clusters, capsules, etc., the application designer has to decide whether an object belongs to the user domain or the telecom system domain. Once the decisions are made, the necessary objects such as stubs can be generated for all the applications objects. The application designer just need to implement the programming codes which are specific to his application domain.

The presented alternative has many advantages. It succeeds in making mobility transparent to the applications. It can be optimised to become very efficient. It is also conformed to the RM-ODP specifications concerning the channel concept.

There are however some disadvantages. From the application point of view, there may be a lack of flexibility in the sense that objects, once allocated, are not allowed to migrate from the user domain, i.e. from the mobile side of the system to the telecom system domain or vice versa. The boundary between the user domain and the telecom system domain constitutes a very rigid borderline which may not be wanted. From the platform point of view and also from the mobility functions point of view, it may not be desirable to tie closely the mobility functions to the platform. The platform should be general enough to fit most distributed systems without major modifications, while the mobility functions, as its name tells, should be generic and easy to be customised for a specific system. It is therefore desirable that the construction of the platform and the mobility functions could be done independently and by different parties.

The Broker Alternative

The Broker Concept

In this alternative, we introduce and use a notion called broker defined in "Understanding Corba" [OPR96]. A broker is a specialised server object acting as intermediary between one or more client objects and one or more server objects. As shown in FIG. 4, a broker represents a client when the client makes a request to a server and represents a server when a server makes a response to a client.

There are defined two brokering schemes:

1. Introduction Brokering

In an introduction brokering scheme active servers register with the broker to make themselves known in the system. The client can then send a message to the broker asking for a server that can perform some task. The introduction broker selects a server to perform the task and returns information to the client accessing that server. The broker introduces the server to the client, so that the client and the server can contact each other directly. This brokering scheme corresponds the RM-ODP trading function [ITUc].

2. Routing Brokering

In a routing brokering scheme, the clients sends a message to the broker asking for a server that can perform some task. The routing broker then selects a server to perform the task and sends the client's request to that server. The broker handles all communications; no direct communication between the client and the server ever takes place.

Mobility Functions M As Routing Broker

In the second solution we adopt the concept of routing brokering with a minor modification. The client send a message to the routing broker not asking for any server able to perform the task but asking for a definite server to perform this task. The broker locates the server and sends the client's request to that server. The mobility functions M will play the broker role. And since an object may play both the roles of client and server, the mobility function M will be a a cascade of two brokers.

The FIG. 5 shows how an object C01 belonging to the user domain interacts with an object C02 belonging the telecom system domain. Interactions enter the mobility functions M at one end and exit at the other.

Both ends of the mobility functions M support both the same interface type containing an "invoke type" operation. This operation originates from the same concept as the one used in the Dynamic Invocation Interface (DII) defined in CORBA [OPR96], [Obja]. This concept allows request to be built and invoked dynamically by client objects. The client object needs to know interface-related information only at the invocation time. No knowledge is necessary at compilation time. The Invoke is composed of an object name (or identifier), an operation name, and a parameter list for the invoked operation.

An IDL (Interface Definition Language) [Obja] of such Invoke operation is given below.

The name is the name or identifier of the object where the call is to be made. The ctx contains information about the client object, environment, or circumstances of a request that are convenient to pass as parameters. The operation is the same operation identifier that is specified in the interface definition of the server object. The arg_list contains a list of arguments for the operation. The operation result will be placed in the result argument after the invocation completes.

```
Interface MobInvocation {
    Invoke    (    in Object target;           //object to be
                   in Context ctx;             //context of op
                   in Identifier operation;    //intended ope
                   in NVList arg_list;         //args to op
                   inout NamedValue result     //operation re
};
```

IDL Specification of the MobInvocation Interface.

The application designer can decide how a client object can call the operation Invoke of the mobility functions M. If calls are to be made in a static way then the stub generated from the interface MobInvocation must be included in the client object code at compilation time. If calls are to be made dynamically, e.g through the Dynamic Invocation Interface (DII) [Objb], than the information about the interface MobInvocation is only needed at run time but not at compilation time.

After entering the mobility functions at the first end and traversing several other objects, the invocation arrives at the other end. In order to avoid a static binding between the mobility functions M and an arbitrary object, and allowing independent development, the DII is again used. Hence, the mobility functions M does not need any interface information of the server object at compilation time.

In this alternative, the mobility functions M is introduced in the system architecture as a functional layer between the application layer and the DPE layer. It is worth noting that the mentioned layer separation is functional and not hierarchical in the sense that every layers can use services offered by other layers. Assuming that the interfaces between layers are well defined, the inside structure of a layer is not relevant to other layers and can be modified without any serious implications.

Let us now return to the same example as in the previous paragraph with four computational objects C01, C02, C03 and C04. As shown in FIG. 12, we start with the same computational model but an intermediary model called derived computational model is introduced in the transition from the computational model to the engineering model. This intermediary model is used to map all interactions traversing the boundary between the user domain and the telecom system domain to interactions with the mobility functions M. From the derived computational model, an engineering model can be elaborated and engineering objects such as stubs can be mechanically generated.

This alternative has several merits. First, the mobility transparency is still preserved at the computational viewpoint. Although an additional model is necessary in the transition to the engineering viewpoint, it does not constitute a major obstacle since the derived computational model can be easily and automatically derived from the computational model.

However, there is still one major limitation. As with the previous alternative, migration of objects across domain boundaries is not allowed. Once allocate to a domain, an object is not allowed to move since interactions across domain boundaries are statically mapped to interactions with the mobility functions M. Objects originally designed without inter-domain interaction capability can not later on communicate with objects in other domains without modification and re-compilation.

The Proxy Alternative

This alternative aims to enhance further the flexibility offered by the previous alternative by loosening the closed binding between the application and the mobility functions M. This is achieved by introducing proxy objects. A proxy acts on behalf of an entity in a transparent way, i.e. when interacting with a proxy, an entity cannot tell whether it is dealing with the real counter-part or with its proxy.

Every object requiring inter-domain interactions is represented by a proxy object located in the same domain as the object interacting with it. When interacting with an object in a different domain, the object is actually interacting with the local proxy object of the required object of the other domain. The proxy will marshall the operation invocation into the invoke operation (as defined in the previous paragraph) at the respective end of M. If interactions are to be in both directions, we need a symmetrical constellation as shown in FIG. 7. In this example an object CO1 in the user domain wants to invoke an operation OpX( ) on an object C02 in the telecom system domain. CO1 is actually invoking OpX on the proxy of C02, namely PCO2. PCO2 will marshall OpX( ) into the Invoke operation of M. This operation will be conveyed through the mobility functions to the other end and M invokes OpX( ) on C02. The result will be conveyed all the way back to CO1. It is worth noting that only PCO2, the proxy of C02, is involved in the invocation of operations on C02 and PCO1, the proxy of CO1 is left outside in this case. The opposite situation will occur when C02 calls operation on CO1.

It is observed that PCO2 has an interface which has the same signature as the one of C02. All operations defined for C02 are defined for PCO2. However, all the operations of PCO2 will perform exactly the same job which is to marshall the initial operation and to call the Invoke operation of M.

CO1 may invoke the operation on C02 in a static way or through the Dynamic Invocation Interface (DII). In the first case, the information about the interface of C02 must be defined and available at compilation time. In the second case, this information is only needed at run time.

Until this stage, the level of flexibility achieved is not higher than in the first alternative. In fact, the flexibility relies on how the proxies are introduced and created. If the introduction and creation of necessary proxies are based on the domain grouping of objects and decided at compilation time, then we return to a solution quite similar to the first alternative. The proxy must somehow be created according to the communications needs and dynamically at run-time to achieve higher level of flexibility.

FIG. 8 shows two run-time configurations. By domain, it is meant either user domain or telecom system domain. If at run time C01 and C02 are within the same domains, then interactions are done through usual channels assuming of course that the access and location transparencies are supported within the domain. On the other hand, if they are in different domains, e.g. one object in the user domain and the other in the telecom system domain, then a proxy is created to transfer all the interactions to the mobility functions which is responsible to deliver them to the other side. Neither C01 nor C02 need to be aware that the proxy PC02 exists. C01 does not distinguish between PC02 and C02 when it is invoking operations. C02 does not distinguish between PC02 and C01 when it is invoked. It should also be possible to design and implement PC02 independently of both C01 and C02. It should also be possible to create proxies dynamically at run-time when interactions across domain boundary are requested.

To fulfil the requirements mentioned above, we adopt the idea presented by OMG in the Dynamic Skeleton Interface (DSI). The purpose for the introduction of the DSI is to enable the building of bridges interconnecting multiple, heterogeneous CORBA-compliant ORBs. However, the DSI is described in CORBA terminology and in CORBA-compliant manner which is not always consistent with the ODP/TINA concepts. We shall attempt here to map all the ideas to the ODP world and give a description which fits better with our context.

The idea is to introduce an object type called Dynamic Object (DO). All the proxies will be of type DO. A proxy, i.e. an object (instance) of type DO is instantiated from an object template called Dynamic Object Implementation (DOI). A proxy is hence semantically separated from the object it represents. The unique relationship which remains between them is Represent, i.e. a proxy represents one and only one object. A proxy shall be deleted when the represented object terminates. An object can, however, be represented by multiple proxies, e.g. one proxy for each client object. An information model is given in FIG. 9.

The object type DO has a unique interface which consists of only one operation, namely Invoke, which is similar to the Invoke operation previously shown.

For an arbitrary object to interact with an object residing in a remote domain, a proxy representing the remote object must be present in the local domain. There are now two problems to solve. First, when an object invokes an operation on a remote object, the invocation must be redirected toward the proxy. Both a naming conversion and an object type conversion are necessary because the client generates an operation request using the reference of the remote server which implicitly refers to the object type of the server object. Second, the operation request must be translated and marshalled into the Invoke operation which is the only operation of the proxy.

To preserve transparency, these two problems must and can only be solved in the Engineering viewpoint and not in the Computational viewpoint. Correspondence must, however, exist between the two viewpoints.

Let us reconsider the example of a computational object CO1 invoking an operation OpX on a remote computational object C02. When requesting an operation OpX on C02, CO1 has to specify the Computational Interface Identifier (CII, also called Computational Interface Reference in TINA

[TIN95a] of the interface 12 of C02, (say C02.12) and the operation name OpX plus all the necessary operation arguments.

Let us now move to the engineering viewpoint. Suppose that C01 and C02 are mapped to the basic engineering objects BEO1 and BEO2, respectively. Depending on the application designer's decision, the operation request can be built in a static way before compilation or dynamically at run-time. This will lead to different types of stubs that should be linked and compiled together with the programming code of BE01. In the first case, the generated stub is specific to the interface C02.12 while in the second case the stub is generic and can be used by any object and in any binding. Dynamic Invocation Interface is an example of the second case. However, in both cases, the engineering operation request must contain the same information as the corresponding computational operation request, i.e. the Computational Interface identifier, the operation name and parameters.

At run-time, when an operation request is issued, a channel must be established to interconnect the involved basic engineering objects. The necessary information to create a channel is contained in an Engineering Interface Reference (EIR) [ITUc]. Contrary to the CII, the EIR is both time and space dependent. The relationship between CII and EIR is shown in FIG. 10.

The DPE or more specifically the nucleus of the DPE node where the call is issued, will be implicated to map the incoming CII to an EIR. This can be done in different ways, for instance, as an exception call in the stub code. The EIR will be used to establish the channel.

In our example, no EIR will be found for BEO2 since it is residing in another domain. Here, the DPE can be equipped with a redirection function which maps the incoming CII, i.e. the CII of BEO2, to the EIR of the proxy PBEO2 instead of the EIR of BEO2. The mapping is forced in the sense that the proxy PBEO2 does not support the interface C02.12 and the operation OpX. A channel can now be establish between BEO1 and PBEO2. When the operation request arrives at the end of the channel, a conversion is necessary before the delivery to PBEO2. The server stub of PBEO2, instead of performing the usual unmarshalling of the request, has to convert it and pack it into the operation Invoke of the PBEO2 which may look like this:

Invoke (C02.I2, Context, OpX, Arguments, Result).

The OMG's Dynamic Skeleton Interface allows indeed the specification of such flexible interface for a server object and the generation of stub from the interface specification. By this technique, the interface and operation name specified by the client object does not have to match with the interface and operations defined at the server object and can be compiled separately. In CORBA revision 2.0, there is also defined a redirection function as described above which supports the DSI.

The operation Invoke of PBEO2 can now be designed to contain a call to the operation Invoke of the user agent of the mobility functions. By this way, the operation request is passed to the mobility functions and conveyed from one domain to the another domain across the boundary. When receiving the request, the user agent in the other domain will invoke the operation OpX( ) on BEO2. The result can then be conveyed the same way back, first to the PBE02 and then finally to BE01. In FIG. 11, the additional redirection function of the DPE and the special server stub of PBE02 are emphasised by using darker colour than on other DPE's objects.

By using the proxy objects as described above, greater flexibility is achieved. The application designer does not have to perform the domain allocation of his objects, i.e. to decide which objects should be allocated to which domain in the implementation phase. Only the usual grouping of objects into clusters, capsules and nodes is required in the transition from the computational viewpoint to the engineering viewpoint. Necessary stubs and skeletons can then be generated automatically from the computational specifications by the development tools. The application designer can proceed with the implementation of application specific programming code. The implementation of the application is completed with the linking and compilation of the application code and the generated stubs.

The definition and creation of proxy objects can be postponed until the configuration and deployment of the application. Depending upon the chosen configuration, the necessary proxy objects will be identified and defined. The proxies can be created at the initialisation of the application and remain alive during the whole life time of the application. They can also be created dynamically according to the interactions and terminate upon the completion of the interaction.

Any object wanting to interact with objects in a different domain must be registered in the mobility functions. The registration of the necessary objects for an application can be done at the initialisation by an object which is customised for the configuration. The definition and creation of a proxy can be conveniently done together with the registration of the object it is representing.

In order to recapitulate what is achieved in this alternative, let us return to the same example considered in the two previous alternatives with for computational objects C01, C02, C03 and C04. In this alternative, it is not necessary to do the domain grouping in the transition from the computational viewpoint to the engineering viewpoint. Only the grouping of objects into clusters, capsules and nodes is performed. C01 and C02 belong to the cluster 1, C03 to cluster 2, C04 to cluster 3. The clusters 1, 2 and 3 are respectively within capsule A, capsule B and Capsule C. From this computational model, an Engineering model is derived and the necessary stubs are generated. Between C02 and C03, there is a need for a channel. The same applies to C03 and C04. Note that in this model all objects, clusters, capsules and nodes are considered as if they are all located within the same domain. The application designer can now add application specific programming code and execute the linking and compilation. The design and implementation of the application is then completed.

At installation, the plant engineer configures the application according to the request of the customer. Based on the configuration, he can derive the registration of objects to the mobility functions and the creation of necessary proxies (see FIG. 12).

This alternative yields very high level of flexibility. The inconveniences are the requirement for a new redirection function on the DPE and the possibility to generate special stub for the dynamic objects. These two inconveniences are however insignificant since DPE's such as CORBA revision 2.0 implementations already include these features.

Merits of the Invention

By introducing Mobility transparency, i.e. hiding the mobility functions to the applications, the design and implementation of mobile applications will be no more complex than the designing and implementation of fixed applications.

Existing fixed applications may be transformed to mobile application, i.e. made available to mobile users without any modification.

REFERENCES

ITU-TS. Basic Reference Model of Open Distributed Processing - Part 1 Overview and guide to use the Reference Model. Rec. X901 (ISO/IEC 10746-1).
ITU-TS. Basic Reference Model of Open Distributed Processing - Part 3: Prescriptive model. Rec. X903 (ISO/IEC 10746-3).
Object Management Group, Inc. The Common Object Request Broker: Architecture and Specification. Document No. 91.12.1, Revision 1.1, ISBN 0-471-58792-3.
Object Management Group, Inc. The Common Object Request Broker: Architecture and Specification. Revision 2.0, Jul., 1995.
Randy Otte, Paul Patrick, and Mark Roy. Understanding Corba - The Common Request Broker Architecture. Prentice Hall PTR, 1996.
TINA-C. Computational Modelling Concepts, Jan., 1995.
TINA-C. Overall Concepts and Principles of TINA, Feb., 1995.

What is claimed is:

1. An arrangement for simplifying the design and implementation of mobile radio terminal services in a communications system, comprising:
   distributed hardware and software components provided in accordance with a distributed processing environment (DPE) and configurable in use to provide one or more services to one or more users;
   means for supporting one or more distribution transparencies in the DPE including access, location, or failure transparencies; and
   means for supporting mobile radio terminal mobility transparency in the DPE such that an application program being executed at a mobile radio terminal located in one radio service area serviced via one radio base station is not interrupted or hindered in its execution when the mobile radio terminal moves to another radio service area serviced via another radio base station;
   wherein the means for supporting mobile transparency in the DPE includes means for integrating a mobile radio terminal mobility function in the infrastructure of a software platform designed in the DPE, and wherein the means for supporting mobile radio terminal mobility transparency in the DPE includes an engineering object interceptor arranged at a boundary between a mobile radio terminal domain and a telecom system domain.

2. Arrangement as claimed in claim 1, wherein the access, location, or failure transparencies are already existing and are defined by Open Distributed Processing (ODP) and adopted by Telecommunication Information Networking Architecture (TINA-C), and wherein the means for supporting mobile radio terminal mobility transparency in the DPE is added to the already-existing the access, location, or failure transparencies.

3. Arrangement as claimed in claim 1, wherein the means for supporting mobile radio terminal mobility transparency in the DPE includes means for mapping computational objects to engineering objects (EO) so as to be non-visible in a computational model of the application program.

4. Arrangement as claimed in claim 1, wherein an engineering model may be developed by mapping each of one or more computational objects (COs) to one or more Basic Engineering Objects (BEOs), the arrangement further comprising:

means for effecting an interaction between computational objects belonging to a same cluster is effected directly using one or more method calls, and
means for effecting communication between computational objects located in a telecom system domain and in different clusters through a channel including stubs, binders, and protocols.

5. Arrangement as claimed in claim 1, wherein user domain computation objects and a telecom system domain computation object residing in different clusters communicate in a channel including an interceptor transparent to an application designer.

6. Arrangement as claimed in claim 1, wherein an application designer can decide from a computational model whether an object belongs to a user domain or a telecom system domain for use in generating application objects.

7. Arrangement as claimed in claim 1, further comprising:
   means for sending a message to a routing broker asking for a server to perform a task,
   wherein the routing broker is configured to implement a mobility function to locate the server and send the request to the server.

8. Arrangement as claimed in claim 7, wherein the routing broker is a cascade of two brokers.

9. Arrangement as claimed in claim 8, wherein the two brokers are configured to allow interactions between an object belonging to a user domain and an object belonging to a telecom system domain.

10. Arrangement as claimed in claim 9, wherein the two brokers support both a same interface type containing an invoke operation to allow a request to be built and invoked dynamically by client objects.

11. Arrangement as in claim 10, wherein the invoke operation includes an object name or identifier, an operation name, and a parameter list for the invoked operation.

12. Arrangement as claimed in claim 7, wherein the mobility function is a functional layer in a system architecture between an application layer and a DPE layer, where each layer may use services offered by another layer.

13. Arrangement as claimed in claim 7, wherein a derived computational model is configured for use in a transition from a computational model to an engineering model in the DPE to map interactions traversing a boundary between a user domain and a telecom system domain to interactions with the mobility function.

14. Arrangement as claimed in claim 13, wherein based on the derived computational model, an engineering model can be elaborated and engineering objects can be generated.

15. Arrangement as claimed in claim 7, further comprising:
   a proxy object for acting on behalf of an entity in a transparent way.

16. Arrangement as claimed in claim 15, wherein the proxy object is adapted to generate an invoke operation for the mobility function.

17. Arrangement as claimed in claim 16, wherein the proxy object is a symmetrical constellation.

18. Arrangement as claimed in claim 15, wherein each proxy object is a Dynamic Object (DO), and a DO instance may be initiated from an object template corresponding to a Dynamic Object Implementation (DOI).

19. Arrangement as claimed in claim 15, wherein a proxy represents only one object and is deleted when the represented object terminates.

20. Arrangement as claimed in claim 15, wherein an object can be represented by multiple proxies.

21. Arrangement as claimed in claim 15, further comprising:
- means for registering in the mobility function first and second objects in different domains, and
- means for defining and registering a proxy for the object the proxy represents.

22. Arrangement as claimed in claim 21, wherein objects may be grouped into clusters, capsules, and nodes.

23. Arrangement as claimed in claim 1, further comprising:

- means for introducing a redirection function on the DPE and for generating a special stub for a dynamic object.

* * * * *